Dec. 1, 1964 T. C. BROCE 3,159,740

UNIVERSAL RADIX ADDER

Filed Jan. 3, 1962 2 Sheets-Sheet 1

INVENTOR.
THOMAS C. BROCE
BY Otto Schmid, Jr.
AGENT

Dec. 1, 1964 T. C. BROCE 3,159,740

UNIVERSAL RADIX ADDER

Filed Jan. 3, 1962 2 Sheets-Sheet 2

United States Patent Office 3,159,740

Patented Dec. 1, 1964

3,159,740

UNIVERSAL RADIX ADDER

Thomas C. Broce, San Jose, Calif., assignor to International Business Machines Corporation, New York, N.Y., a corporation of New York Filed Jan. 3, 1962, Ser. No. 164,017
3 Claims. (Cl. 235—169)

The present invention relates to computing apparatus and more particularly to an electronic adding apparatus for use therein.

The binary system of calculating has certain well known advantages; but, when mixed numbers are used, a considerable amount of code conversion circuitry is required to convert the mixed numbers to binary notation and then convert the answer back to the mixed number designation. A mixed number as used herein is defined as a number having a series of digits wherein more than one radix is used in the series. As a result, the complexity and the resulting expense of the equipment has limited the use of computing machines for certain mixed number applications, such as direct addition in the British monetary system, for example.

Thus, an object of this invention is to provide an improved device for adding mixed numbers.

Another object is to provide an improved means for obtaining directly the sum of two mixed numbers.

It is another object of this invention to provide an apparatus which can be used to add two mixed numbers in any desired radix within the capacity of the apparatus.

Still a further object is to provide a device for obtaining the sum of two mixed numbers without the necessity of any code conversion.

According to the invention, apparatus for adding two mixed numbers is provided in which each number to be added is loaded into an incrementing device. A high speed source of pulses is gated to step one of the incrementing devices down to a reference level while the second incrementing device is stepped away from the arbitrary value a corresponding number of steps. Logic circuit means are provided to select any radix within the capacity of the incrementing devices so that an output corresponding to the sum of the mixed numbers is provided.

The foregoing and other objects, features and advantages of the invention will be apparent from the following more particular description of a preferred embodiment of the invention as illustrated in the accompanying drawings.

Figure 1:
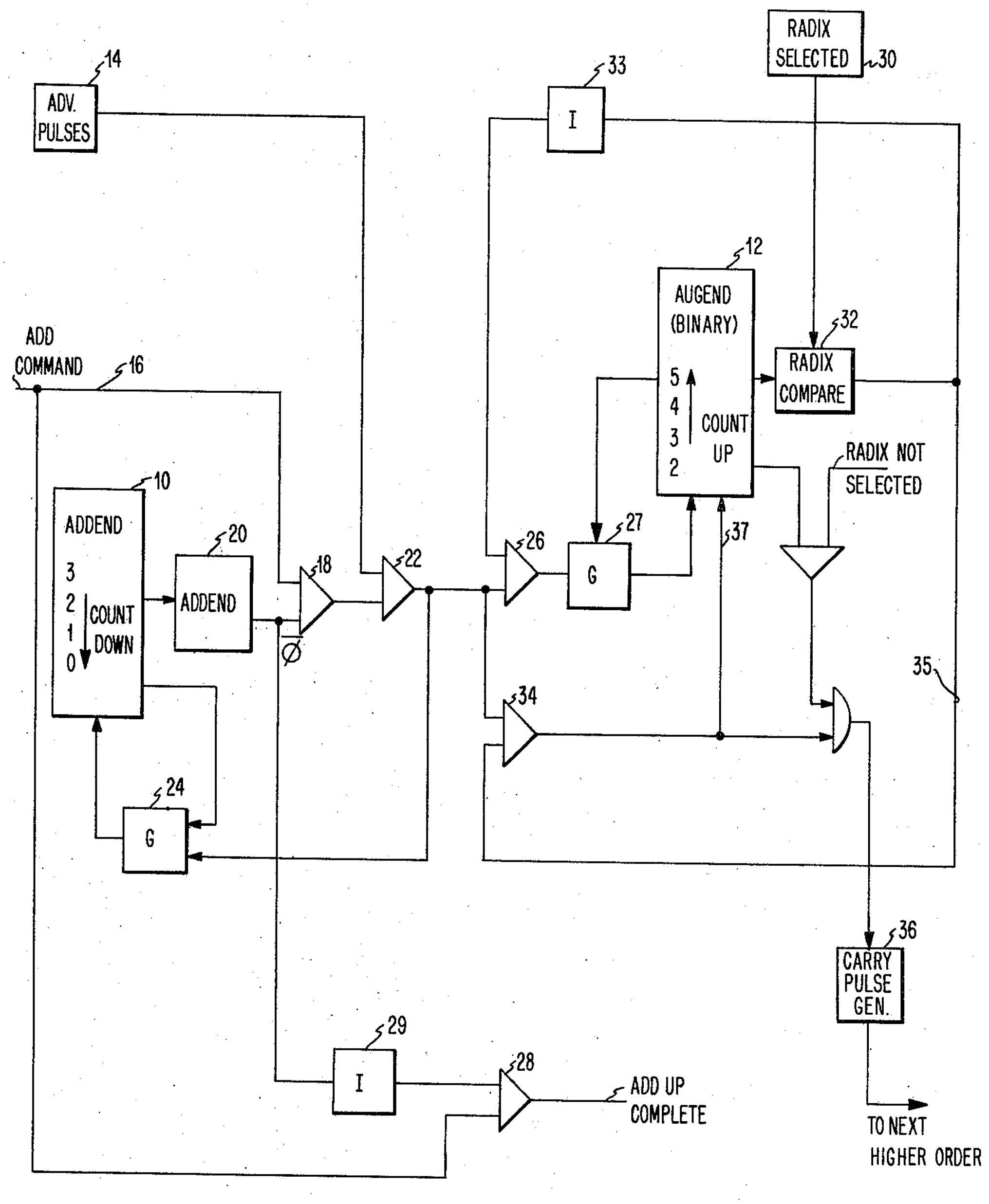

In the drawing, FIG. 1 is a diagrammatic block diagram of a general embodiment of the invention.

Figure 2:
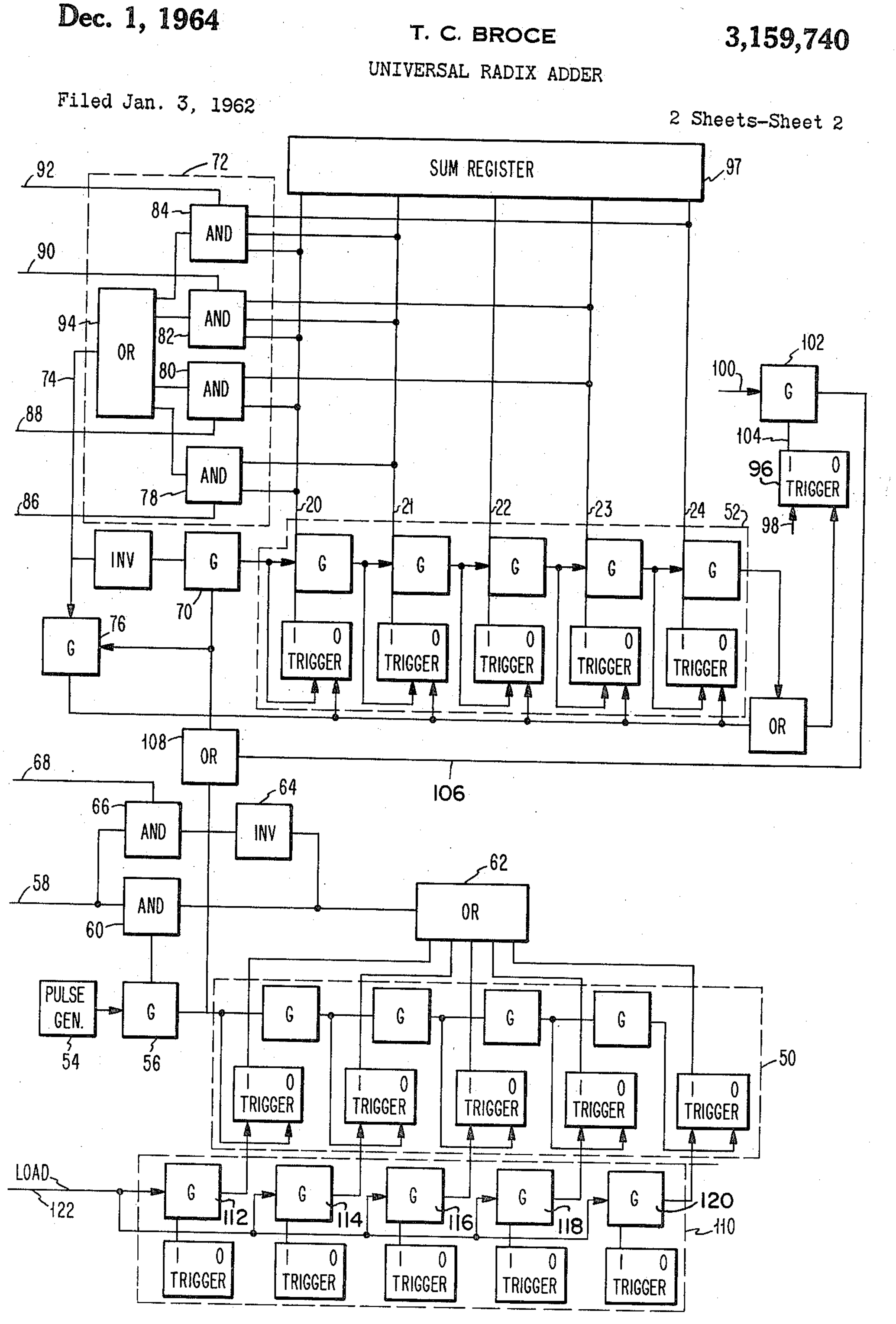

FIG. 2 is a diagrammatic block diagram showing a specific embodiment of the invention for use in adding directly numbers in the British monetary system.

Before proceeding with the description of the circuitry of the invention, it will be well to understand that this circuitry isd escribed as being used in a serial mode computer.

Referring to the drawings and particularly to the diagrammatic block diagram shown in FIG. 1 the adding apparatus comprises two incrementing devices 10, 12 into which the two numbers to be added, the addend and the augend, are loaded. A source of high speed pulses 14 is provided to step the incrementing device 10 containing the addend downward to a reference level and at the same time to step the incrementing device 12 containing the augend upward a corresponding number of steps under control of a control means. The incrementing devices may be any suitable device capable of being stepped one step at a time in response to a control pulse. The arbitrary value to which the addend incrementer is stepped is ordinarily zero, but another arbitrary value may be chosen if desired.

The control means shown in FIG. 1 comprises an add command line 16 which is connected to one input of an AND circuit 18, the other input of AND circuit 18 is conditioned by a decoder means 20 for sensing that the count in the addend incrementer has not reached the reference level. The output of AND circuit 18 thus conditions the one input of AND circuit 22 which, when the advance pulses are present on the other input, produces an output. The output from AND circuit 22 conditions count down gate 24 and also conditions one input of an AND circuit 26. The second input of AND circuit 26 is conditioned by sensing that the count in the augend incrementer 12 has not reached the selected radix. The output of AND circuit 26 conditions the count up gate 27 so it can be seen that both the addend incrementer and the augend incrementer are stepped by the advance pulses.

The control means provided for closing the gate controlling the source of pulses when the count in the addend incrementer reaches the reference level and providing an "add operation complete" signal comprises the decoder means 20 and an AND circuit 28. The output of the decoder means 20 for sensing that the addend incrementer 10 has not reached the reference level is inverted by inverter 29 and conditions one input of AND circuit 28. The other input to AND circuit 28 is connected to the add command line 16. When AND circuit 28 is conditioned signifying that the addend incrementer count has reached the reference level, the output "add operation complete" is generated. The AND circuit 18 is simultaneously deconditioned which thereby deconditions AND circuit 22 and blocks the advance pulses so that the incrementers are not stepped.

Logic means 30 are provided to select any radix within the capacity of the incrementing device and associated control circuitry is provided to reset the augend incrementer and produce a carry pulse when the count in the augend incrementing device reaches the selected radix. The radix control circuitry comprises a radix comparison circuit 32 which senses when the selected radix and the count in the augend incrementer are equal. When a compare condition exists an output is developed from the radix compare circuit. The output is inverted in inverter 33 and the inverted output deconditions AND circuit 26 so that the next pulse from the advance pulse generator does not step the augend incrementer 12 through the count up gate 27. The ouput of the radix compare circuit 32 is also connected by line 35 to one input of AND circuit 34. The other input of AND circuit 34 is connected to the output of AND circuit 22 so that upon the arrival of the radix comparison circuit output the AND circuit 34 is partially conditioned and the next advance pulse produces an output of AND circuit 34 which is connected to the reset input 37 of the augend incrementer 12 thereby causing the augend incrementer to be reset. A carry pulse is then produced in carry pulse generator 36 and the carry pulse is conducted to the next higher order where it is stored temporarily until the next higher order digits are added. This action is accomplished during the period of one of the advance pulses so that, if the count of the addend register has not reached the reference level, the next advance pulse will again advance the count in the augend register from the value to which the register was reset, usually zero.

Referring now to FIG. 2 wherein there is shown a specific embodiment of the invention capable of adding mixed numbers directly which illustrates the universal nature of the device. There are provided two registers 50, 52 into which the addend and the augend are loaded. The registers shown in FIG. 2 comprise conventional binary counters but any weighted binary code can be used if it has the ability to count. The register has a plurality of stages corresponding respectively to $2^0$, $2^1$, $2^2$, $2^3$, and $2^4$ thus, the registers shown in FIG. 2 are capable of adding numbers to a sum which does not exceed 32. However, there is no limit to the actual size of register that could be used since the capacity of the register can be expanded indefinitely. A suitable source of high speed pulses 54 is provided, and these pulses are gated through gate 56 to step the addend register 50 down to zero and at the same time to step the augend register 52 up a corresponding number of steps.

The add operation is initiated by an up level on the add command line 58. This line is connected to one input of an AND circuit 60, and the other input of the AND circuit 60 is up when the number in the addend register does not equal zero. The output of the AND circuit 60 opens the gate 56 so that the pulses step the addend register 50 down until OR circuit 62 produces a down level output which signifies that there are no more one bits stored in the addend register and the number therefore is equal to zero. The output of the OR circuit 62 is inverted by means of inverter 64 and conditions one input of an AND circuit 66. The second input to the AND circuit 66 is provided by the add command line. The sensing that the addend equals zero deconditions the AND gate 60 and closes the gate 56 thereby blocking the high speed pulses. Simultaneously AND circuit 66 is conditioned and the output on line 68 signifies that the add operation is complete.

Simultaneously with the stepping down of the addend register, the high speed pulses also step the augend register 52 upward since each of the high speed pulses is passed through gate 70 when the other input to gate 70 is present which signifies that the addend has not reached the selected radix. Thus, the augend register is stepped upward in binary fashion until the selected radix is reached. At this point an output from the radix selection means 72 produces an up level on line 74 which deconditions gate 70 thereby interrupting the count up of the augend register. The output also conditions the radix end carry gate 76 so that the next high speed pulse produces an output from gate 76. This output is connected to the reset input of each stage of the augend register to reset the augend register and also produces a carry pulse out to the next higher order. The carry pulse is stored temporarily until the digits of the next higher order are added and the carry is loaded into the augend register.

The radix selection means 72 shown in FIG. 2 comprises four AND circuits 78, 80, 82, 84 each of which is coupled to select a particular radix. For example, the select radix four line 86 is connected to AND circuit 78 which senses when a one appears in the augend register stages representing $2^0$ and also a one appears in the augend register stage representing $2^1$. When there is coincidence between up levels on the three input lines an output is produced from the AND circuit 78 which in turn produces an output from the OR circuit 94. Thus, it can be seen that the output from the OR circuit 94 is produced when the count reaches three so that when the fourth pulse from the high speed pulse source is applied to the augend register the gate 76 will be conditioned and the register reset and a carry out for the next higher order generated. Likewise, to select radix 10 AND circuit 80 is provided which senses when a one appears in the $2^0$ stage of the augend register and additionally a one appears in the $2^3$ stage of the register. Coincidence between an up level on these lines and an up level on the select radix 10 line 88 produces an output which signifies that a nine count is present in the augend register and in a similar manner to that described above the tenth pulse will reset the register and produce a carry out. In the same manner the select radix 12 is performed by sensing ones in the $2^0$, $2^1$ and $2^3$ stages of the register. Correspondence with these up levels and an up level on the select radix 12 line 90 will produce an output from the AND circuit 82 which will denote a count of 11 in the register and a further pulse from the high speed pulse source will cause the augend register to be reset and a carry generated which is transmitted to the next higher order. The select radix 20 is operated by sensing when a one appears in the $2^0$, $2^1$ and $2^4$ stages of the augend register. When there is coincidence between these conditions and an up level on the select radix 20 line 92 and output is generated from AND circuit 84 and this in turn produces a signal on the radix limit line 74 so that the next high speed pulse operates as before to reset the register and generate a carry out to the next higher order.

The loading means 110 shown in FIG. 2 comprises a register having a plurality of stages representing $2^0$, $2^1$, $2^2$ etc. factors. Gates 112, 114, 116, 118, 120 sense ones in the stages of the register and produce an output when a pulse is applied to the LOAD line 122. The output is coupled to the corresponding stage of the addend register 50 to set the trigger of that stage to 1. A similar type of loading means may be used to load the augend register.

A specific example of the use of the adder to add directly two numbers in the British monetary system will be given. For example, suppose the sum of 2 pounds, 10s., 7d, 2f., and 1 pound, 12s., 8d., 3f is desired. Since this is a serial device, the two digits of the lowest order, the farthing values of 2 and 3 respectively, are first loaded into the respective registers by any suitable loading means, the add command line 58 is brought up and the select radix 4 line 86 is brought up. The addition is performed by stepping the addend register from two down to zero and stepping the augend register upward two steps from the three loaded into the register. A carry is generated on the first pulse since the three stored in the augend register conditions AND circuit 78 and the first pulse will open gate 76 thereby resetting the augend register and producing a carry out.

The second pulse will step the addend register to zero thereby generating an add complete signal, and the second pulse will also advance the count in the augend register to 1 since it has previously been reset to zero. The sum of one for the farthing value is read out and sent to a sum storage means 97 and the carry is stored in a temporary storage means. The temporary storage means shown in FIG. 2 comprises a trigger 96 which is reset to zero by a pulse on reset line 98 and set to the one state when a carry is generated.

The seven and eight pence digits are entered into the addend and augend registers respectively. When the augend register has been loaded, a pulse on the carry test line 100 strobes a gate 102. The other input to the gate is connected to sense whether the carry storage trigger 96 is set. An up level on line 104 concidental with the carry test pulse will produce an output on line 106 which is entered through OR circuit 108 to step the augend register upward one step and thereby add in the carry from the next lower order. The add command line and the select radix 12 line 90 are then brought up and the operation is continued as before until the addend register count equals zero. A sum of 3 and a carry are generated. The carry is stored in the temporary storage means, the sum is read out and sent to the sum register, and the digits 10 and 12 for the shillings order are then loaded into the counters. The add command line 58 and the select radix 20 line 92 are brought up and the high speed pulses step the addend register until the count reaches zero at which time the add operation complete signal is generated. There results a sum of 2 and a carry. The digits 2 and 1 of the pound order are entered into the register and the add command line is brought up so that the high speed pulses step the addend register down to zero. No radix select line was energized so the augend register functions as a binary counter and the sum of four is generated. Thus, the direct sum of the two numbers can be obtained in a simple manner without the use either of code conversion equipment or a highly complicated and expensive system.

The universal character of the adder can also be seen from the possible use of the device as described above. If it is desired to add numbers containing gallon and quart terms, this can be easily accomplished by energizing the select radix 4 line so that the answer is obtained directly in gallons and quarts.

Likewise, numbers can be added in dozen and unit terms by the selection of the select radix 12 line and the answer given in dozens and units.

The selection of any other desired radix within the capacity of the register used can be easily achieved by slight additional circuitry. For example, if it is desired to add numbers having years, months and day terms then it is necessary only to add another AND circuit and connections to sense ones in the $2^0$, $2^2$, $2^3$ and $2^4$ to obtain a select radix 30 line. Thus any radix within the capacity of the register can be selected.

The device can also be used to add conventional binary numbers by selecting no radix lines. The augend register then acts as a binary counter and generates a carry when the register reaches its capacity.

While there have been shown and described and pointed out the fundamental novel features of the invention as applied to preferred embodiments, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A circuit for adding two mixed numbers having a plurality of orders, comprising:
- two registers;
- means for loading a first order of said numbers into said registers;
- a source of pulses;
- control means;
- means for gating said pulses from said source under control of said control means to step one of said registers down to zero and the other register upward the same number of steps so that the first order of one of said numbers is added to the first order of the other of said numbers;
- temporary storage means;
- logic means operable to select a radix within the capacity of said second register so that the second register will be reset and a carry pulse sent out to said temporary storage means when the second register reaches the selected radix;
- means for loading the next order of said number into said registers;
- gating means for entering a carry directly into one of said registers; and
- means to repeat the operation for all orders of the numbers sequentially whereby the sum of the two mixed numbers is obtained directly.

2. An adder circuit for adding two mixed numbers having a plurality of orders, comprising:
- a first and a second counter;
- means for loading the first order of said numbers to be added into said counters;
- a source of pulses;

- a first gating means responsive to an add command and said source of pulses to step said first counter down to zero;
- second gating means responsive to said add command and said source of pulses to substantially simultaneously step said second counter upward the same number of steps;
- a temporary storage means;
- logic means operable to select a radix within the capacity of the second counter so that the second counter is reset and a carry pulse is stored in said temporary storage means when the second register reaches the selected radix;
- means responsive to a zero count in said first counter to disconnect the source of pulses from said counters and give an add complete signal;
- means for loading the next order of said numbers in said counters;
- means for gating a carry signal from said temporary storage means directly into one of said counters; and
- means for repeating the operation for all orders of the number sequentially whereby the sum of the two mixed numbers is obtained directly.

3. An adder circuit for serially adding two mixed numbers having a plurality of orders, comprising:
- an addend register;
- an augend register;
- means for loading a first order of the numbers to be added into said registers;
- a source of high speed pulses;
- a first gating means responsive to an add command for gating said high speed pulses to said addend register to step said addend register down toward zero;
- a second gating means for gating said high speed pulses to said augend register to step said augend register upward a like number of steps;
- means for sensing the condition of said addend register;
- logic means for selecting a radix within the capacity of said augend register;
- a temporary storage means;
- means under control of said sensing means to produce a carry pulse from said augend register to said temporary storage means when said count reaches said selected radix;
- means responsive to said sensing means to stop the gating of said high speed pulses to said addend register and said augend register when the count in said addend register equals zero;
- means for loading a second order of the numbers to be added into said registers;
- means for gating said carry pulse directly from said temporary storage means into said augend register; and
- means for repeating the operation for all orders of the numbers whereby the sum of the two mixed numbers is obtained directly.

References Cited in the file of this patent

UNITED STATES PATENTS

| | | |
|---|---|---|
| 2,989,237 | Duke | June 20, 1961 |
| 3,089,644 | Wensley | May 4, 1963 |